Patented Apr. 26, 1949

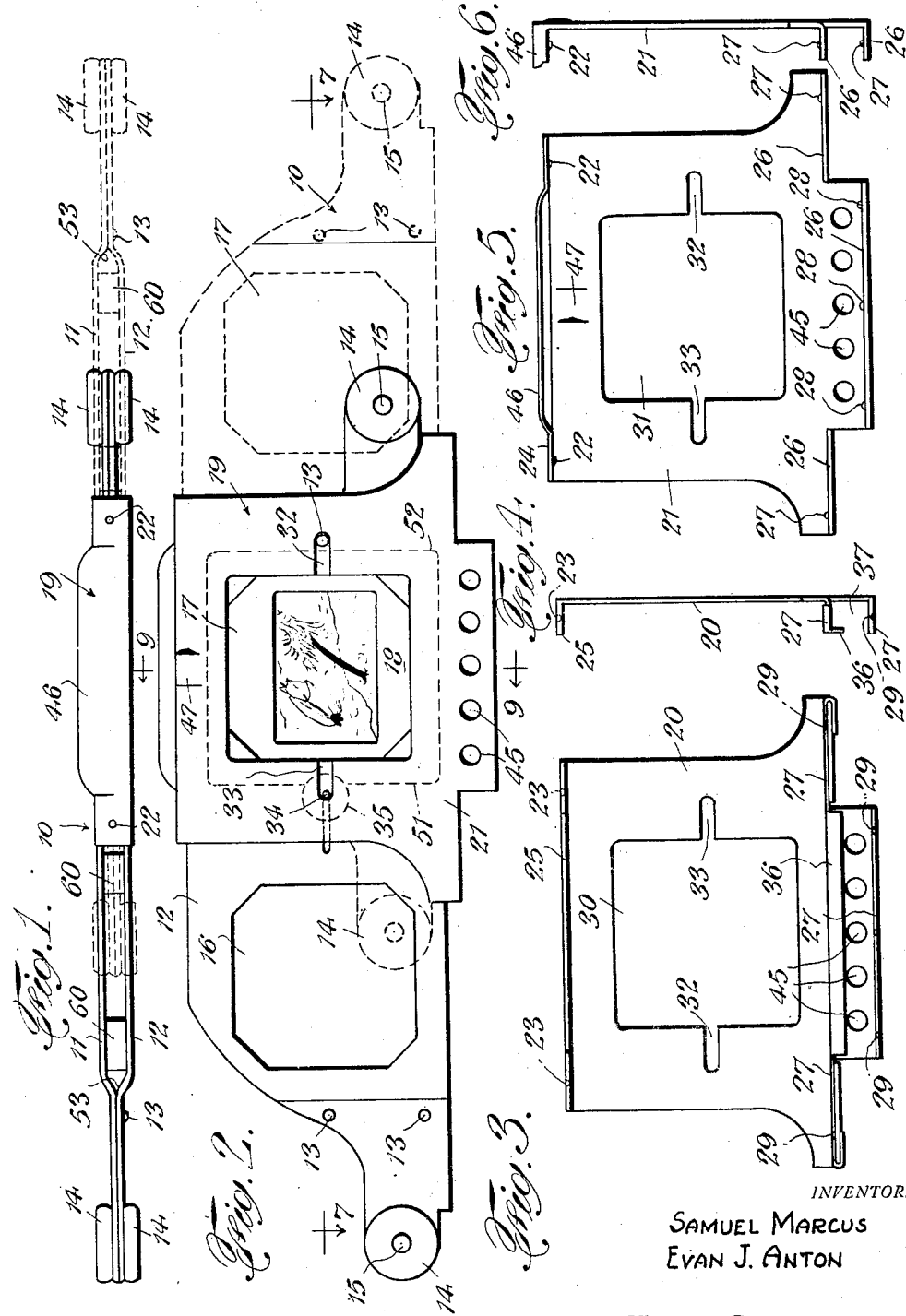

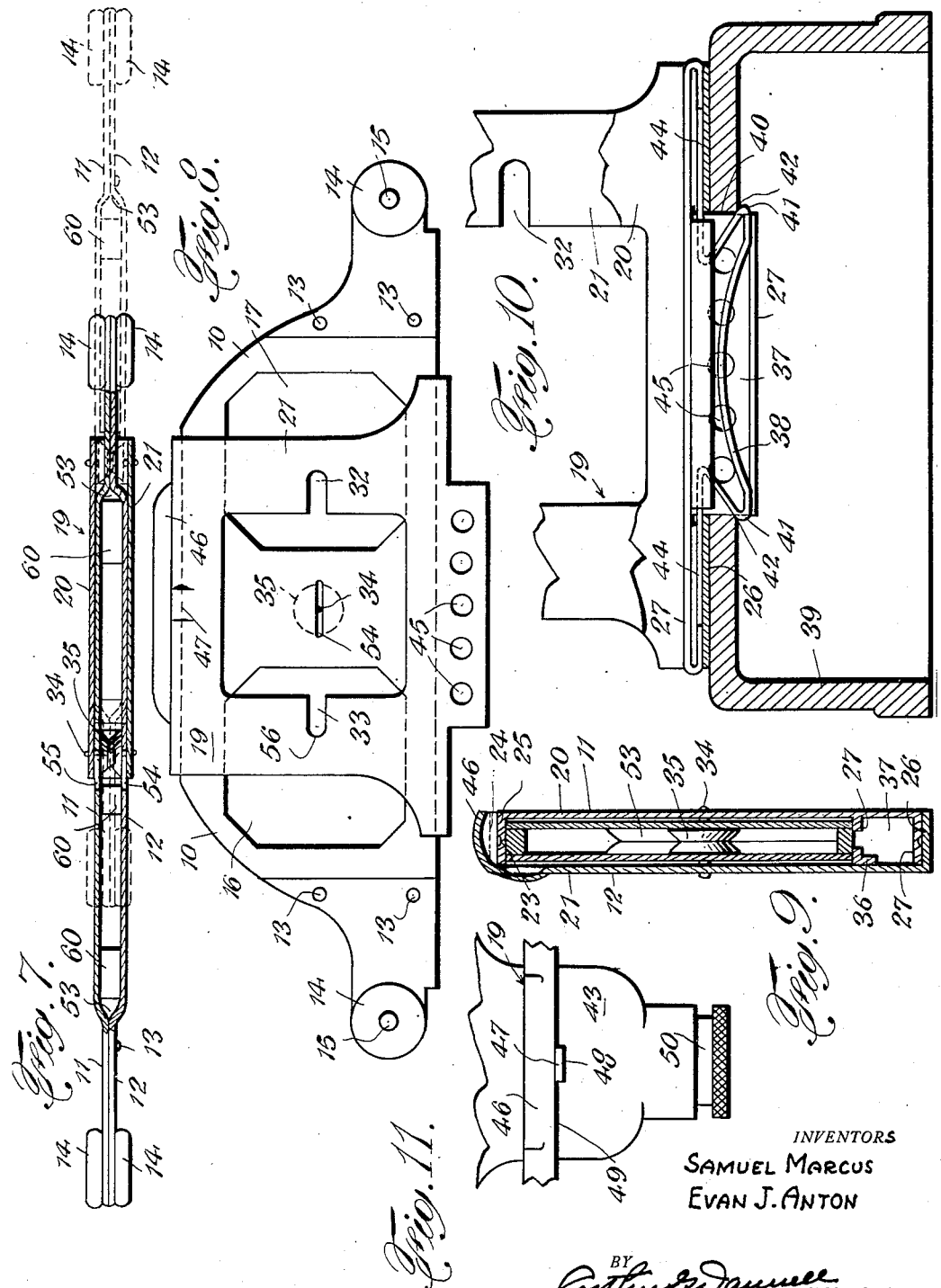

2,468,566

UNITED STATES PATENT OFFICE 2,468,566

VENTILATED SLIDE CARRIER

Samuel Marcus, New York, and Evan J. Anton, Sunnyside, N. Y.

Application February 19, 1946, Serial No. 648,698

1 Claim. (Cl. 88—28)

The present invention relates to a ventilated slide carrier, and more particularly to that type of slide carrier which is used in conjunction with a projector for projecting "stills."

The object of the present invention is to provide a slide carrier which is inexpensive to manufacture, simple in structure, and which may be manipulated with great ease and celerity.

Another object of the present invention is to provide a ventilator housing surrounding the slide carrier which may be removably attached to a projector so that the slide carrier will be properly positioned.

Still another object of the present invention is to provide a slide carrier adapted to hold two pictures, whereby one picture may be inserted or removed while the other picture is being projected.

Another object of the present invention is to provide means on the ventilator housing surrounding the slide carrier and also cooperating means on the slide carrier itself for automatically centering or properly focusing the picture on the screen.

Other objects and advantages of the present invention will be obvious as brought out in the following specification.

Reference will be had to the accompanying drawings, forming a part of the specification, in which similar reference characters indicate corresponding parts throughout the several views, in which—

Fig. 1 is a plan view;

Fig. 2 is a front view;

Fig. 3 is an elevation of the rear member of the ventilator housing;

Fig. 4 is a side view thereof;

Fig. 5 is an elevation of the front member of the ventilator housing;

Fig. 6 is a side view thereof;

Fig. 7 is a sectional view on the line 7—7 of Fig. 2;

Fig. 8 is a front elevation of the front assembly of the slide carrier and ventilator housing, showing the slide carrier centrally located therein;

Fig. 9 is an enlarged cross section on the line 9—9 of Fig. 2;

Fig. 10 is an enlarged cross section partly in elevation showing how the ventilator housing is fixed to the body of the projector, and Fig. 11 is a fragmentary detail of the focusing end of the projector showing the slide carrier mounted therein.

Referring to the drawings, wherein we have shown by way of illustration merely, a picture slide carrier 10 comprising a pair of plates 11 and 12, which are fastened together by rivets 13, and spaced apart by spacers 60, adjacent the bottom thereof. The plates 11 and 12 are held together at each end, face to face by a pair of hand manipulating buttons 14 and rivets 15. When the slides 18 are inserted between the plates 11 and 12 they are substantially in alignment with the openings 16 and 17 in the plates 11 and 12.

The slide carrier 10 is mounted in a ventilator housing 19, consisting of a rear plate 20 and a front plate 21, which are brought together over the top and bottom of the slide carrier 10 and secured to each other by male and female connections 22 and 23 punched in the flanges 24 and 25 at the top of the rear and front members 20 and 21 of the ventilator housing.

The bottom flanges 26 and 27 are secured in the same manner as the top flanges by reason of the male and female members 27' and 29 respectively.

The flanges 26 and 24 of the front member 21 overlap the flanges 25 and 27 of the rear member 20 when they are secured together by the male and female members.

The ventilator housing members 20 and 21 have openings 30 and 31, connecting with horizontal slots 32 and 33. The slots 32 and 33 are adapted to engage a shaft 34 carrying a V-slotted roller 35, for the purpose of which will hereinafter be explained.

The rear member 20 of the ventilator housing as shown in Figs. 3 and 4, has the upper flange 27 bent downwardly as shown at 36 to form a channel 37, for the reception of a spring 38 as shown in Fig. 10.

When the slide carrier and ventilator housing members are attached to the projector housing 39, the flange 27 carrying the spring 38 is placed in the recess 40, in the projector housing 39, so that the projecting parts 41 of the spring 38, projecting from the ends of the channel 37, will be urged under the ends 42, of the recess 40 and act as keepers to hold the ventilator housing and slide carrier in the proper position in respect to the optic axis of the lenses.

The free ends 44 of the spring 38 are held between the flanges 26 and 27.

The rear member 20 and the front member 21 of the ventilator housing 19, have openings 45 therein, to permit the passage of cold air currents entering from the bottom of projectors louvered base plate.

The cold air enters through the openings 45 and out through the louvre 46. When the bottom of the ventilator housing 19 is secured in the base 39 of the projector 43 by the spring 38, it is also secured at the top thereof by a pressed out portion 47, which engages a slot 48 in the upper part of the projector housing 43. This holds the ventilator housing firmly in the center of the projector both at the top and bottom thereof, so that the openings 30 and 31 therein are rigidly and properly centered, in respect to the optic axis of the lenses.

In operating the device, the slide carrier and ventilator housing are placed in the slot 49, in the projector 43 adjacent the focusing barrel 50, as heretofore described.

The picture or slide 18 is inserted in the slide carrier 10 in the opening 17 as shown in dotted lines in Fig. 2, and the slide carrier is then moved to the left as shown by full lines in Fig. 2, so that the picture is properly framed in the housing 19.

When the picture is placed in the opening 17 the edges 51 and 52 of the picture are adjacent to the roller 35 and the V-portion 53 respectively of the plates 11 and 12 as shown in Fig. 1, so that when the slide carrier is moved to the left as shown in Fig. 2, the V-portion 53 of the slide carrier urges the left edge 51 of the picture into the V-portion of the roller 35.

Referring to Fig. 8, it will be seen that the roller 35 has a shaft 34, which rides in a slot 54 and 55 in the plates 11 and 12 of the slide carrier 10.

When the edge 51 of the picture 18 is brought toward the roller 35 by reason of the edge 52 being urged by the V 53 in the slide carrier 10, it will stay in that position until the shaft 34 of the roller 35 comes into contact with the end 56 of the slot 33 in the stationary ventilator housing 19. The slide carrier 10 is urged to the left until the shaft 34, which is now against the end 56 of the slot 33 and is held there until the slide reaches the extreme movement to the left, and in so doing it carries the shaft 34 along the slot 54 until it reaches the extreme right edge of the slot 54 where it is then held rigidly between the right hand edge of the slot 54 and the left hand edge 56 of the slot 33, and when in this position as shown in Fig. 2, the edges 51 and 52 of the picture 18 are rigidly held in the V-slot of the roller 35 and the V-slot 53 of the slide carrier 10.

When a new picture is placed in the opening 16 of the slide carrier 10, and the slide carrier is moved to the right as shown in dotted lines, the new picture will fit into the V-slot 53 on the left side of the slide carrier 10 and will be carried along to the right with the slide carrier 10 to engage with the roller 35. When the roller 35, and its shaft 34 rides into the slot 32 at the right hand side of the ventilator housing 19, it will be held in the end of the slot 32 until the shaft 34 rides the full length of the slot 54, and by so doing will automatically bring the V-shaped roller 35 up against the right hand edge of the new picture 18 inserted in the opening 16.

It will be seen by referring to Fig. 2, that as the pictures are inserted and removed in the openings 16 and 17, and the slide carrier is brought to the left or right, that the roller 35 will cooperate with the V-shaped portions 53 in the slide carrier 10 to automatically center either picture in respect to the optic axis of the lenses.

The pictures or slides 18 are also properly positioned in respect to the optic axis of the lenses by reason of the spacers 60 between the plates 11 and 12, which support the bottom edge of the pictures 18.

Many modifications may be made from the present invention without departing from the spirit thereof.

We claim:

A slide carrier for carrying a slide or picture of the kind described comprising, a pair of plates secured together substantially at the ends thereof but spaced apart between the ends, a pair of registered openings in each plate substantially adjacent the ends thereof, a pair of plate spacers adjacent the aforesaid registered openings and located adjacent the bottom of the aforesaid openings for supporting a slide or picture thereon, a V-shaped roller having a shaft mounted between the aforesaid plates and substantially in the center thereof, a horizontal slot in each plate supporting each end of said shaft of said V-shaped roller, a housing supporting said slide carrier comprising, a pair of interlocking plates, an opening in each plate registering with each other and also registering with the registered openings in the plates of the slide carrier, when said openings in said slide carrier are brought between said openings in said housing, a horizontal slot cut into each side of said openings in said housing for receiving the ends of said V-shaped roller shaft when said slide carrier is moved longitudinally in either direction, and spring means adjacent the bottom of said housing for securing said housing to a projector.

SAMUEL MARCUS.
EVAN J. ANTON.

REFERENCES CITED

The following references are of record in the file of this patent:

UNITED STATES PATENTS

| Number | Name | Date |
| --- | --- | --- |
| 1,108,256 | Sharlow | Aug. 25, 1914 |
| 2,108,844 | Brady | Feb. 22, 1938 |
| 2,113,844 | Kleerup | Apr. 12, 1938 |
| 2,298,369 | Greaves | Oct. 13, 1942 |
| 2,298,413 | Reid | Oct. 13, 1942 |
| 2,335,326 | Walter | Nov. 30, 1943 |